United States Patent [19]

Fujiwara

[11] Patent Number: 5,805,201
[45] Date of Patent: Sep. 8, 1998

[54] DEVICE FOR AUTOMATICALLY CONTROLLING A TELEVISION

[75] Inventor: Hidetoshi Fujiwara, Musashino, Japan

[73] Assignee: Utec Inc., Tokyo, Japan

[21] Appl. No.: 638,777

[22] Filed: Apr. 29, 1996

[30] Foreign Application Priority Data

| Apr. 27, 1995 | [JP] | Japan | 7-005419 U |
| May 19, 1995 | [JP] | Japan | 7-006197 U |
| May 19, 1995 | [JP] | Japan | 7-155065 |
| Sep. 19, 1995 | [JP] | Japan | 7-263621 |
| Oct. 12, 1995 | [JP] | Japan | 7-289190 |
| Apr. 12, 1996 | [JP] | Japan | 8-114396 |

[51] Int. Cl.$^6$ .............................. H04N 7/16; H04N 5/65; G08B 23/00

[52] U.S. Cl. .......................... 348/5.5; 340/573; 348/818; 348/819

[58] Field of Search ................... 348/818, 819, 348/5.5; 340/573

[56] References Cited

U.S. PATENT DOCUMENTS

| 4,321,593 | 3/1982 | Ho et al. | 340/541 |
| 4,835,614 | 5/1989 | Ryu . | |
| 5,408,276 | 4/1995 | Morales | 348/818 |
| 5,521,652 | 5/1996 | Shalvi | 348/819 |
| 5,541,664 | 7/1996 | Cuadrado | 348/553 |

*Primary Examiner*—Stephen C. Buczinski
*Attorney, Agent, or Firm*—Jacobson, Price, Holman & Stern, PLLC

[57] ABSTRACT

An automatic control device is provided for automatically controlling a television. The automatic control device comprises a distance measuring portion (17) for measuring a distance between a screen of the television and a viewer watching the television, a control unit 11 for determining whether the distance measured by the distance measuring device (17) is shorter than a predetermined distance, a signal generating circuit (13) for outputting a power source signal when the control unit 11 determines that the measured distance is shorter than the predetermined distance, and an infrared-ray emitting diode 14 for emitting infrared rays of light for turning on or off an auxiliary power source of the television 20 in accordance with the power source signal.

17 Claims, 19 Drawing Sheets

DEVICE FOR AUTOMATICALLY CONTROLLING A TELEVISION

BACKGROUND OF THE INVENTION

1. Field of the Invention

This invention relates to an automatic control device capable of forbidding infants or children to watch television when they are just about to watch it close at hand or when they watch it for a long time without interruption.

2. Description of the Prior Art

Generally, when we watch television at close range, we are liable to weaken our eyesight and become shortsighted. In addition, disadvantageously, we are exposed to leakage X-rays and leakage electromagnetic waves leaking from the television.

However, in a conventional television, no consideration has been given to a distance between a screen of the television and a person watching it, and it is also possible to watch the television at close range. For this reason, especially infants tend to approach the television to watch it. In a family having such infants, parents must warn the infants against watching television at close range. However, in the absence of the parents, the infants are apt to watch television at close range.

When an infant or a child stays alone in the home, the infant tends to watch television for a long time without interruption. Accordingly, the infant enlarges the fatigue of the eyes, and the eyesight fails.

SUMMARY OF THE INVENTION

An object of the present invention is to provide a device for automatically controlling a television capable of forbidding infants or children to watch television at close range.

Another object of the present invention is to provide a device for automatically controlling a television capable of forbidding infants or children to watch television for a long time without interruption.

A feature of the present invention is that a device for automatically controlling a television including a light receiving element that receives infrared rays of light and being capable of being operated by remote control comprises a distance measuring means for measuring the distance from the screen of the television to a viewer watching the television; and an infrared-ray emitting means for emitting a state changing signal for changing a state of the screen when the distance measured by the distance measuring means is shorter than a predetermined distance.

Another feature of the present invention is that a device for automatically controlling a television including a light receiving element that receives infrared rays of light and being capable of being operated by remote control comprises an operation detection means for detecting the operation of the television; a watching-time setting means for setting a watching time during which a viewer watches the television; a timer for counting the watching time set by the watching-time setting means; and an infrared-ray emitting means for emitting infrared rays of light for turning on or off an auxiliary power source of the television when the operation of the television is detected by the operation detecting means at a moment when the timer completes counting the watching time.

DETAILED DESCRIPTION OF THE EMBODIMENTS

Embodiments of a device for automatically controlling a television according to the present invention will be described with reference to the drawings.

[First Embodiment]

Figure 1:
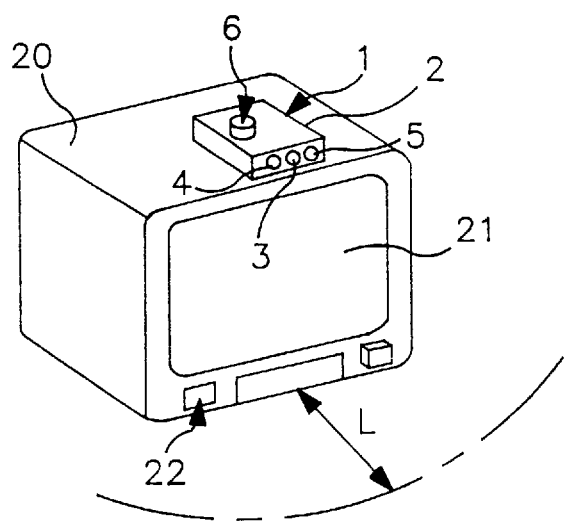
FIG. 1 is a perspective view illustrating a state in which a device for automatically controlling a television according to the present invention is put on the television.

A television 20 shown in FIG. 1 is controlled by an infrared-ray signal emitted from a remote control device, not shown, and has a light receiving unit 22 provided under a screen 21 of the television 20 to receive infrared rays of light. A device 1 for automatically controlling a television is placed on the television 20.

On the front surface of a body 2 of the device 1, there are provided a transmitter 3 for emitting ultrasonic waves P (see FIG. 2) forwards, a receiver 4 for receiving ultrasonic waves P' that are reflected, and a window 5 through which an infrared-ray emitting diode (see FIG. 2) that will be described later emits infrared rays of light forwards. On the upper surface of the body 2, there is disposed a setting knob 6 for setting a distance L from the screen 21, in other words, for setting a distance L that is the allowable shortest distance between a viewer and the screen 21 when the viewer watches the television.

Figure 2:
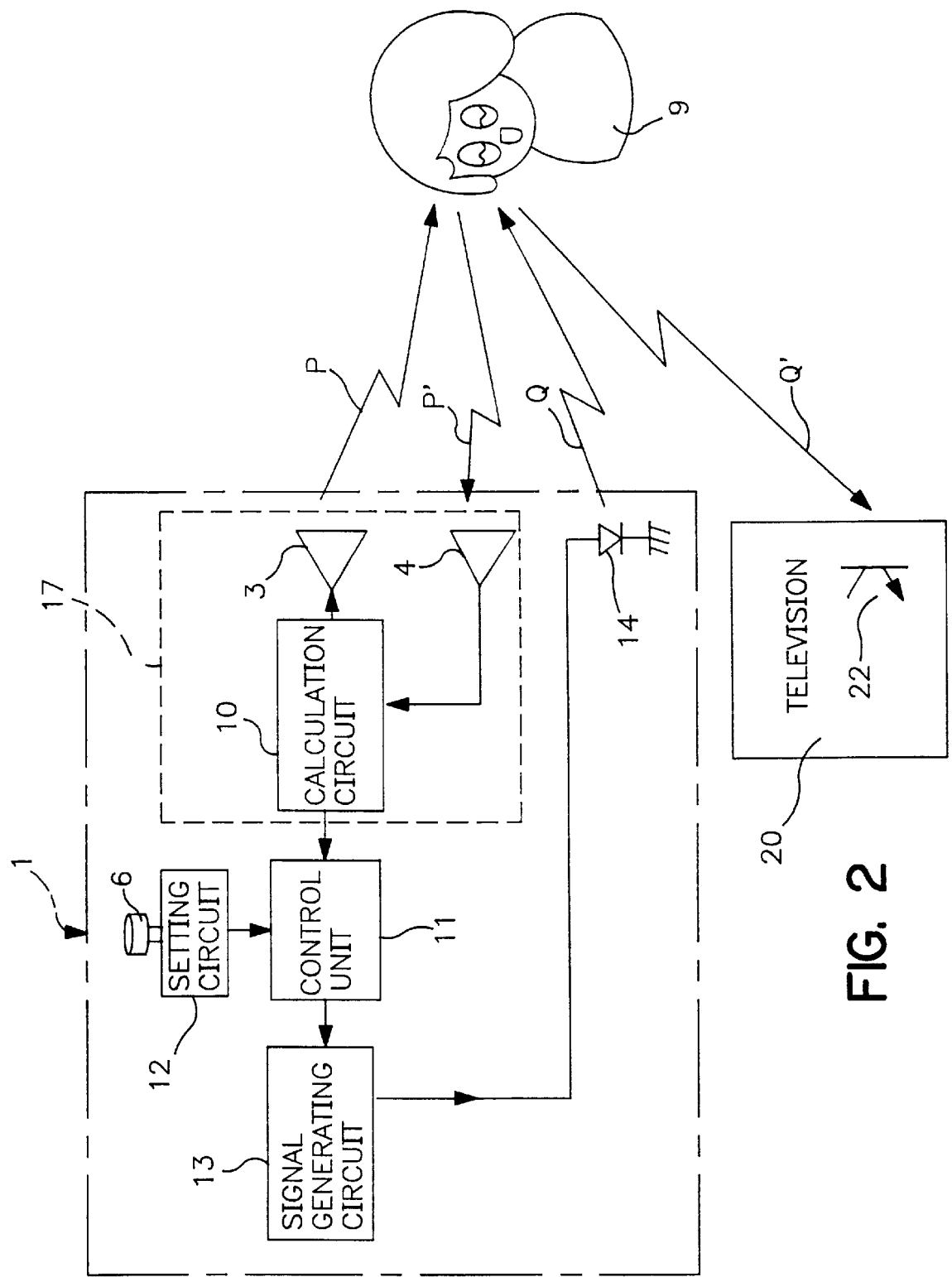
FIG. 2 is a block diagram illustrating a construction of the device of FIG. 1.

As shown in FIG. 2, the automatic control device 1 comprises a calculation circuit 10 for calculating a distance from the screen 21 to an infant 9 based on an interval of time between the emission of ultrasonic waves P of the transmitter 3 and the receiving of reflected ultrasonic waves P' of the receiver 4, a setting circuit 12 for setting the distance L by adjusting the setting knob 6, a signal generating circuit 13 for outputting a signal, such as a power source signal, for automatically controlling the television, a control unit 11 that compares a distance (measured distance) calculated by the calculation circuit (determination means) 10 with the distance L predetermined by the setting circuit 12 and determines whether the measured distance is shorter than the predetermined distance L or not, and an infrared-ray emitting diode (infrared-ray emitting means) 14 for emitting infrared rays of light (infrared changing signal) as the power source signal.

A distance measuring device (distance measuring means) 17 is made up of the transmitter 3, receiver 4, and calculation circuit 10.

The calculation circuit 10 not only calculates a distance between the screen 21 and the infant 9 but also causes the transmitter 3 to transmit ultrasonic waves for 0.5 milliseconds per second.

The control unit 11 comprises a CPU and the like. When the control unit 11 judges that the measured distance is shorter than the predetermined distance L, the control unit 11 causes the signal generating circuit 13 to output a power source signal and waits for five seconds after the power source signal is output. When the distance measured by the calculation circuit 10 becomes longer than the predetermined distance L during this waiting period, the control unit 11 causes the signal generating circuit 13 to output the power source signal again.

The operation of the above-mentioned embodiment is described below.

First, the distance L is set in advance by the setting knob 6 of the device 1. After the power source of the television 20 is turned on, a main switch (not shown) of the device 1 is turned on to operate the circuits.

The calculation circuit 10 causes the transmitter 3 to transmit ultrasonic waves P for 0.5 milliseconds per every second. The ultrasonic waves P are reflected by an infant or a child 9, and the reflected ultrasonic waves P' reflected thereby are received by the receiver 4.

The calculation circuit 10 calculates a distance from the screen 21 to the infant 9 based upon an interval of time between the emission of the ultrasonic waves P and the receiving of the reflected ultrasonic waves P'.

The control unit 11 compares the distance measured by the calculation circuit 10 with the distance L set by the presetting circuit 12, but does not cause the signal generating circuit 13 to generate a power source signal when the measured distance is longer than the predetermined distance L, in other words, when the infant 9 is more than the predetermined distance L apart from the screen 21. When the infant 9 approaches the screen 21 and enters the range of the predetermined distance L (moment t1 in FIG. 3), the measured distance becomes shorter than the predetermined distance L, and the control unit 11 causes the signal generating circuit 13 to output a power source signal.

Figure 3:
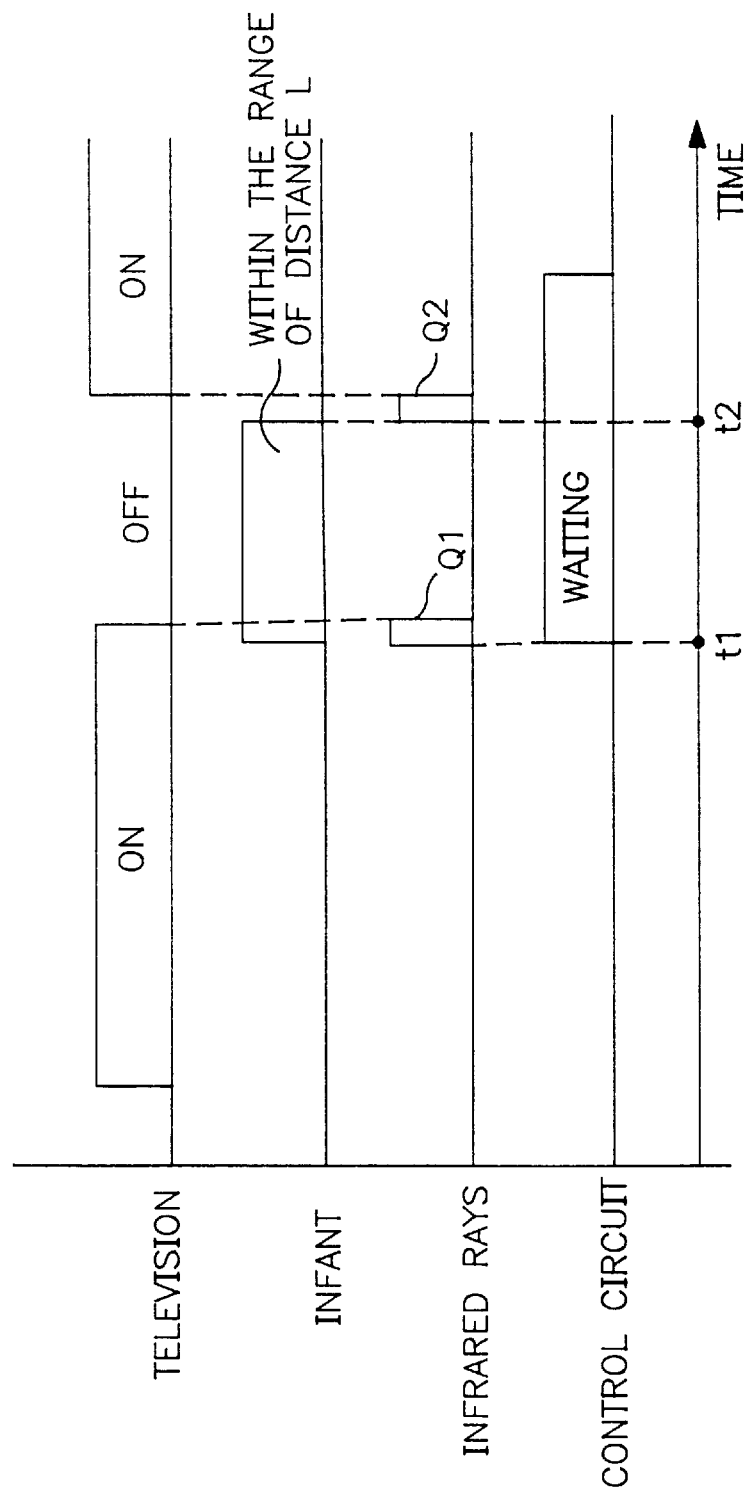
FIG. 3 is a time chart for illustrating the operation of the device.

In response to the power source signal, the infrared-ray emitting diode 14 emits an infrared ray Q1 of a power source signal at a moment t1 shown in FIG. 3, and the infrared ray Q1 goes out through a window 5 of the body 2. The emitted infrared ray Q1 is reflected by the infant 9, a wall, or the like. The reflected infrared ray Q1' is received by the light receiving unit 22 of the television 20. When the light receiving unit 22 receives the infrared ray Q1' of the power source signal, the auxiliary power source of the television 20 is turned off, thereby forbidding the infant 9 to watch the television 20. The operation of the television 20 is stopped when the auxiliary power source is turned off, but its operation can be resumed by the remote control device unless the main power source is turned off.

When the television 20 is turned off, the control unit 11 waits for five seconds only. When the infant 9 moves out of the range of the predetermined distance L (moment t2 in FIG. 3) during this waiting period, a power source signal is output from the signal generating circuit 13. Then, the infrared-ray emitting diode 14 emits an infrared ray Q2 of a power source signal (moment t2 in FIG. 3) to go out through the window 5 of the body 2. The emitted infrared ray Q2 is reflected by the infant 9 or the wall, and the reflected infrared ray Q2' is received by the light receiving unit 22 of the television 20. When the light receiving unit 22 receives the infrared ray Q2' of the power source signal, the auxiliary power source of the television 20 is turned on, and the television 20 can be watched.

When the infant 9 moves out of the range of the predetermined distance L centering the screen 21 after the waiting period of five seconds has passed, the control unit 11 causes the signal generating circuit 13 not to output the power source signal. In this case, the television 20 can be watched by remote control from a position out of the range of the predetermined distance L centering the screen 21.

Figure 4:
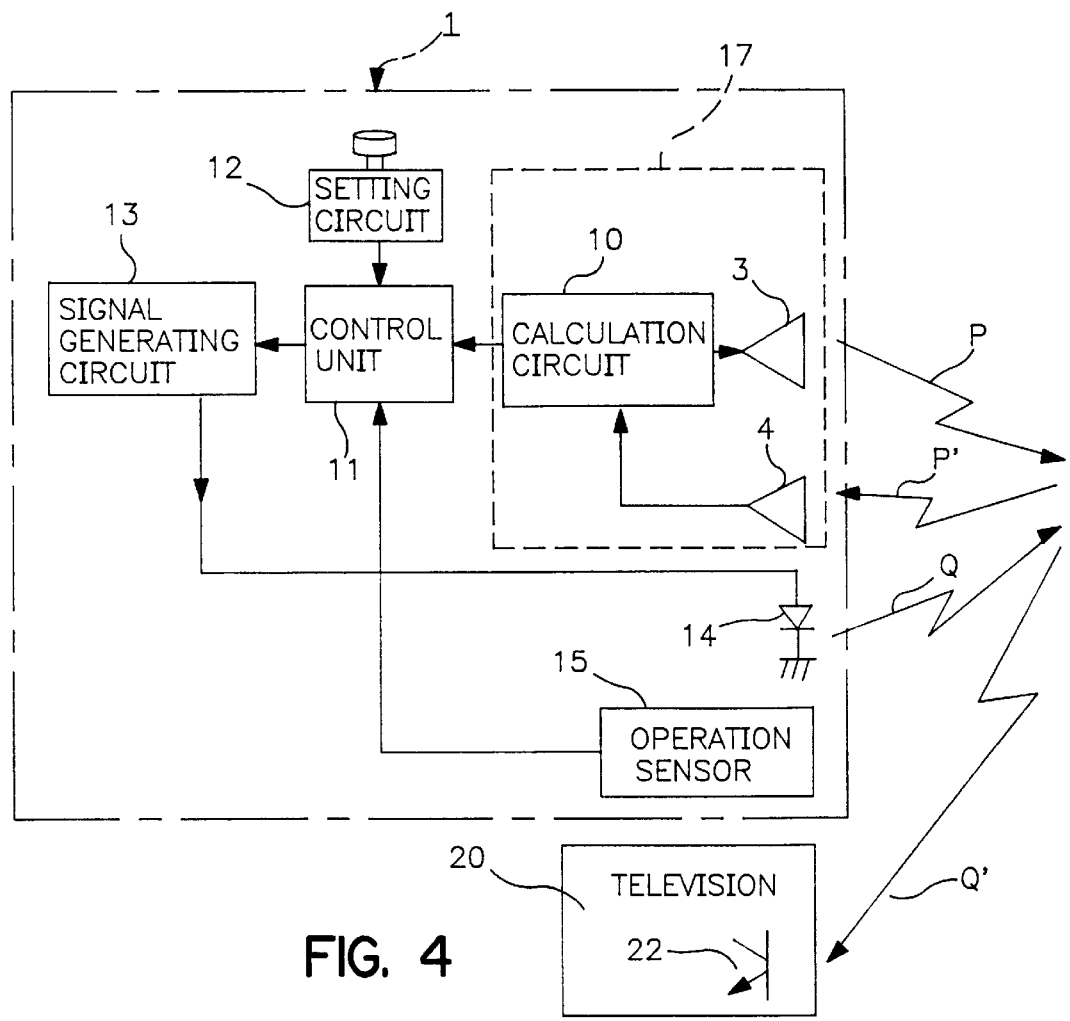
FIG. 4 is a block diagram of a device for automatically controlling a television according to another example.

FIG. 4 illustrates another example of this embodiment. In this embodiment, the device 1 is provided with an operation sensor (operation detecting means) 15 for detecting the operation of the television 20. When the television 20 is not in operation (when the auxiliary power source is not turned on), no infrared ray is emitted from the infrared-ray emitting diode 14. The operation sensor 15 is constituted by a coil that detects a magnetic flux formed by a horizontal synchronizing signal of the television 20 in order to detect the operation of the television 20. The operation sensor 15 may detect the operation of the television 20 from the brightness of the screen 21.

The control unit 11 causes the signal generating circuit 13 to output a power source signal when the operation sensor 15 detects the operation of the television 20 or when the distance measured by the calculation circuit 10 becomes shorter than the predetermined distance L.

Figure 5:
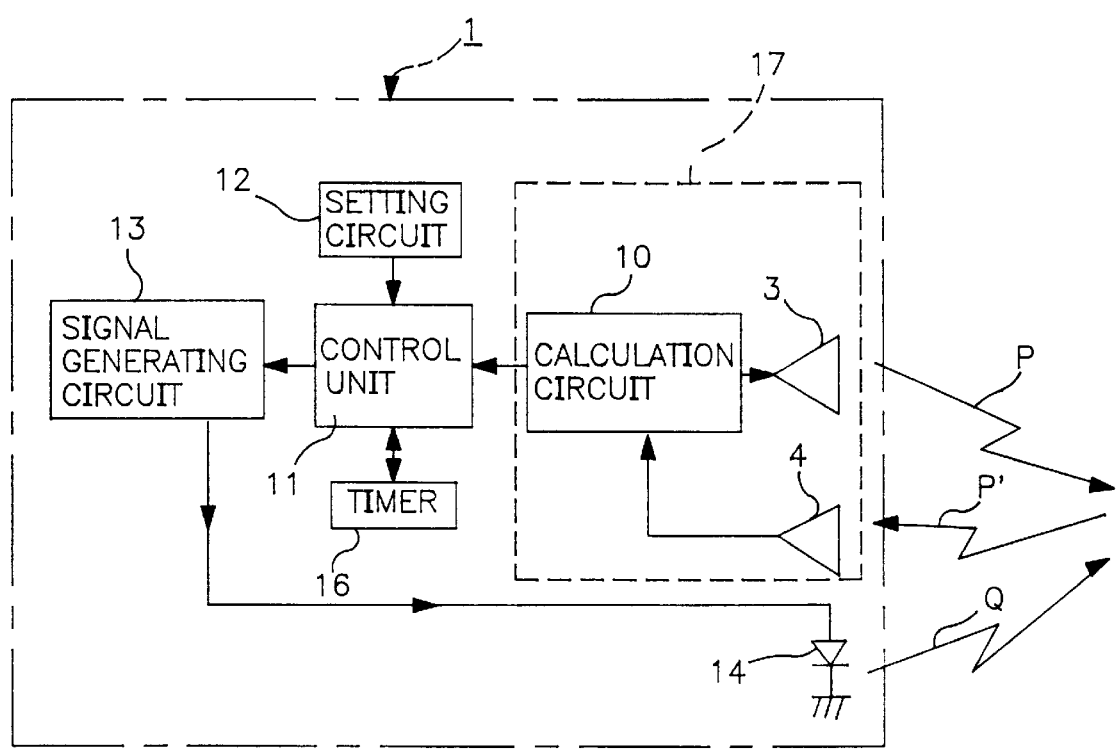
FIG. 5 is a block diagram of a device for automatically controlling a television according to still another example.

FIG. 5 illustrates still another example of this embodiment. In FIG. 5, reference numeral 16 denotes a timer that starts counting when the distance measured by the calculation circuit 10 becomes shorter than the predetermined distance L. When the measured distance becomes longer than the predetermined distance L while the timer 16 is counting the time for, for example, five seconds, the control unit 11 causes the signal generating circuit 13 not to output the power source signal.

When the distance measured by the calculation circuit 10 is shorter than the predetermined distance L after the time of five seconds is counted by the timer 16, the control unit 11 causes the signal generating circuit 13 to output a power source signal. Then, the infrared-ray emitting diode 14 emits an infrared ray of a power source signal, and the auxiliary power source of the television 20 is turned off.

According to this embodiment, the television 20 is not turned off if the infant 9 moves out of the range of the predetermined distance L in less than five seconds even when the infant 9 approaches the screen 21 within the range of the distance L.

In addition, when the television 20 is turned off, the control unit 11 waits for five seconds only. When the infant 9 moves away from the screen 21 by more than the distance L during this waiting period, the signal generating circuit 13 outputs the power source signal. Thereby, the infrared-ray emitting diode 14 emits an infrared ray of a power source signal, and the auxiliary power source of the television 20 is turned on, so that the television 20 can be watched.

The timer 16 is reset when the timer 16 completes the counting of five seconds or when the measured distance becomes longer than the predetermined distance L before the timer 16 completes the counting of five seconds.

In the above-mentioned embodiment, the signal generating circuit 13 outputs the power source signal. Instead, the signal generating circuit 13 may output a channel-up signal (channel signal) for shifting the channel up so that the channel is changed over to, for example, an upper channel. When the infant 9 moves away from the screen 21 by more than the distance L during the waiting period (see FIG. 3), the signal generating circuit 13 may output a channel-down signal for shifting the channel down so that the channel is changed over to a lower channel to return the screen 21 to the initial state.

[Second Embodiment]

Figure 6:
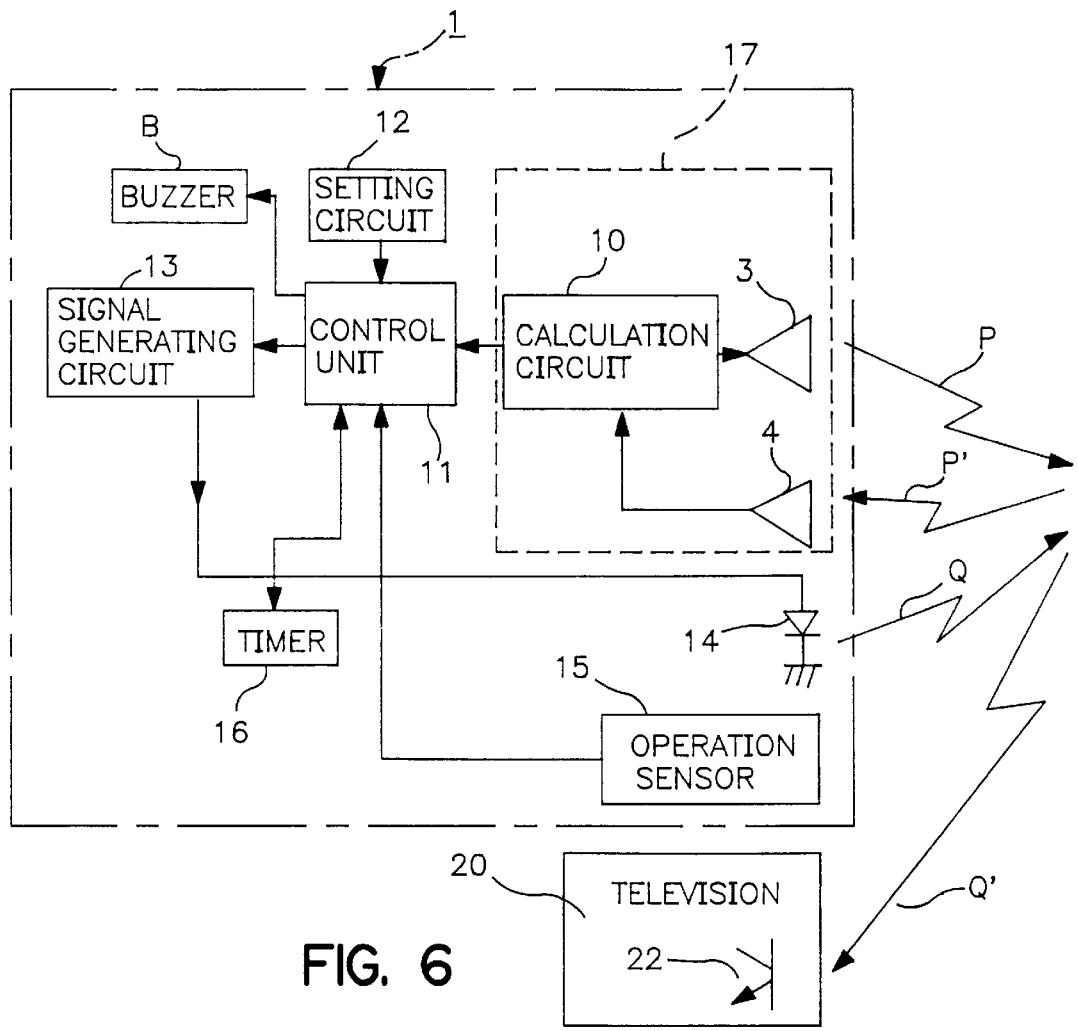
FIG. 6 is a block diagram illustrating a construction of a device for automatically controlling a television according to a second embodiment.

FIG. 6 illustrates a second embodiment. In this embodiment, the device 1 is provided with an operation sensor 15, a timer 16, and a buzzer B. When the distance measured by the calculation circuit 10 becomes shorter than the predetermined distance L while the operation sensor 15 is detecting the operation of the television 20 (see FIG. 7), the timer 16 is actuated to start counting, and the buzzer B sounds a warning while the timer 16 is counting the time (moments t1 to t2 in FIG. 7).

Figure 7:
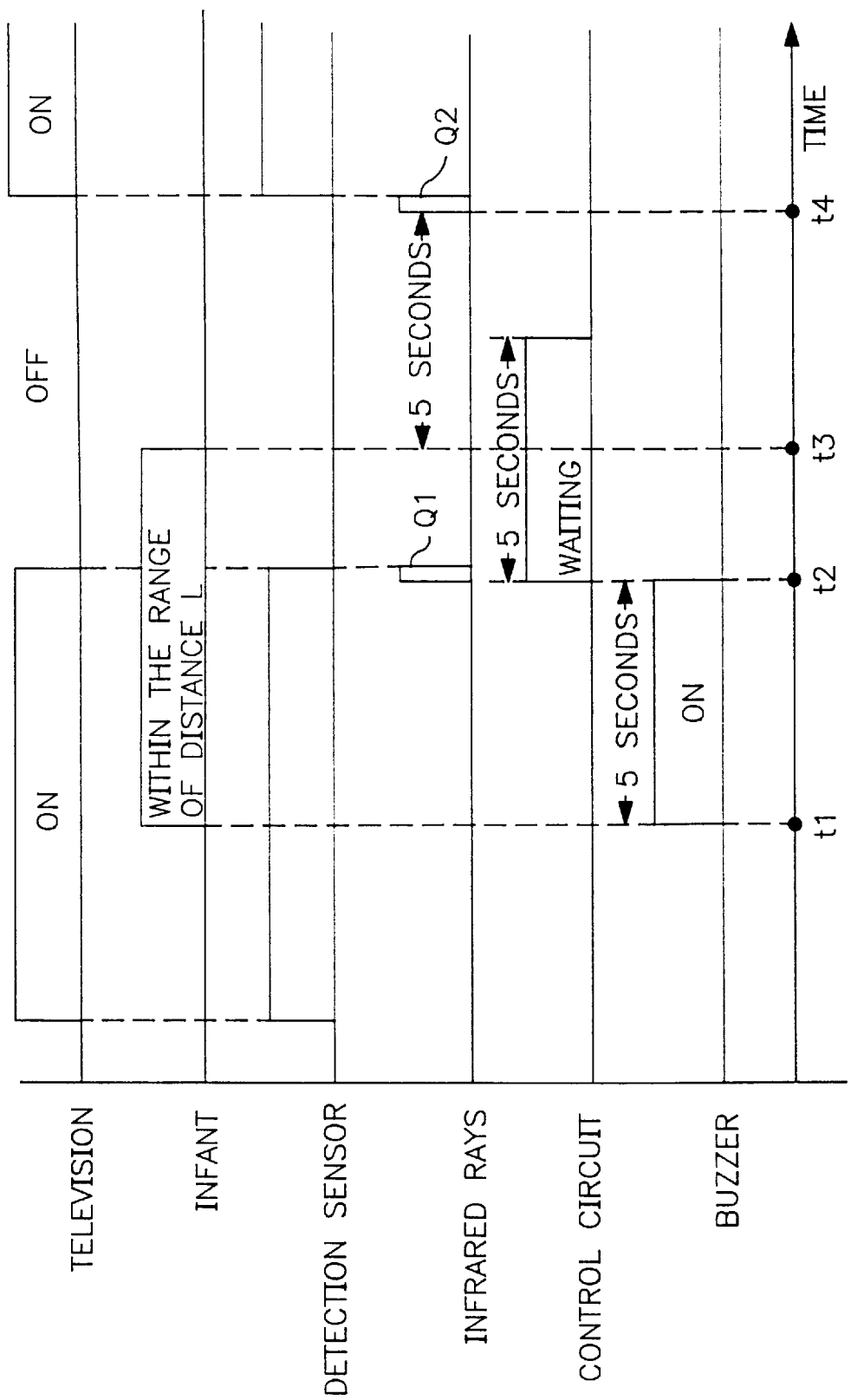
FIG. 7 is a time chart for explaining the operation in the second embodiment.

When the infant 9 moves out of the forbidden range of the predetermined distance L during the warning of the buzzer B, the buzzer B ceases operating and the signal generating circuit 13 stops outputting a power source signal. However, when the distance measured by the calculation circuit 10 is shorter than the predetermined distance L after the passage of five seconds, the control unit 11 causes the signal generating circuit 13 to output a power source signal. Therefore, as shown in FIG. 7, the infrared ray emitting diode 14 emits an infrared ray Q1 of a power source signal, and the auxiliary power source of the television 20 is turned off.

When the television 20 is turned off, the control unit 11 waits for five seconds only. When the infant 9 moves away from the screen 21 by more than the distance L (moment t3 in FIG. 7) during this waiting period and five seconds elapse after the moment t3, the signal generating circuit 13 outputs the power source signal. Then, the infrared-ray emitting diode 14 emits an infrared ray of a power source signal, and the auxiliary power source of the television 20 is turned on to be watched.

According to this embodiment, the auxiliary power source of the television 20 is not turned off even when the infant 9 approaches the screen 21 within the distance L, provided that the infant 9 moves away from the screen 21 by more than the distance L in less than five seconds. Even when the infant 9 moves away from the screen 21 by more than the distance L in less than five seconds after the auxiliary power source of the television 20 is turned off, the auxiliary power source of the television 20 is not turned on for five seconds after the infant 9 moves away therefrom. That is, the auxiliary power source of the television 20 is turned on or off maintaining a time lag of five seconds with respect to the motion of the infant 9. Therefore, the infant 9 is prevented from so frequently going into and out of the range of the predetermined distance L.

In the second embodiment, the buzzer B sounds a warning only when the timer 16 is counting, but the buzzer B may sound a warning during the waiting if the infant 9 is within the predetermined distance L from the television. In detail, the buzzer B may sound a warning from the start (t1) of the counting of the timer 16 to the completion (t3) of the waiting period and, if the infant 9 is more than the predetermined distance L apart from the television, the operation of the buzzer B may be stopped.

[Third Embodiment]

Figure 8:
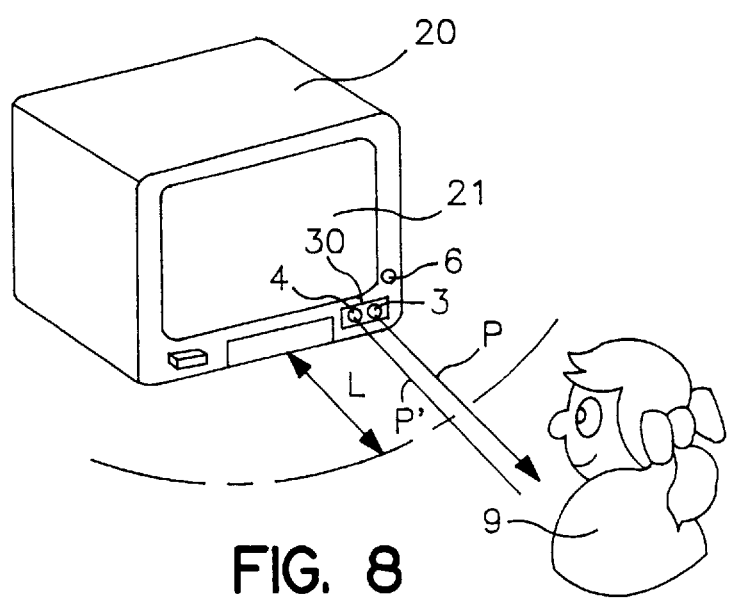
FIG. 8 is a perspective view illustrating a third embodiment of the present invention.
Figure 9:
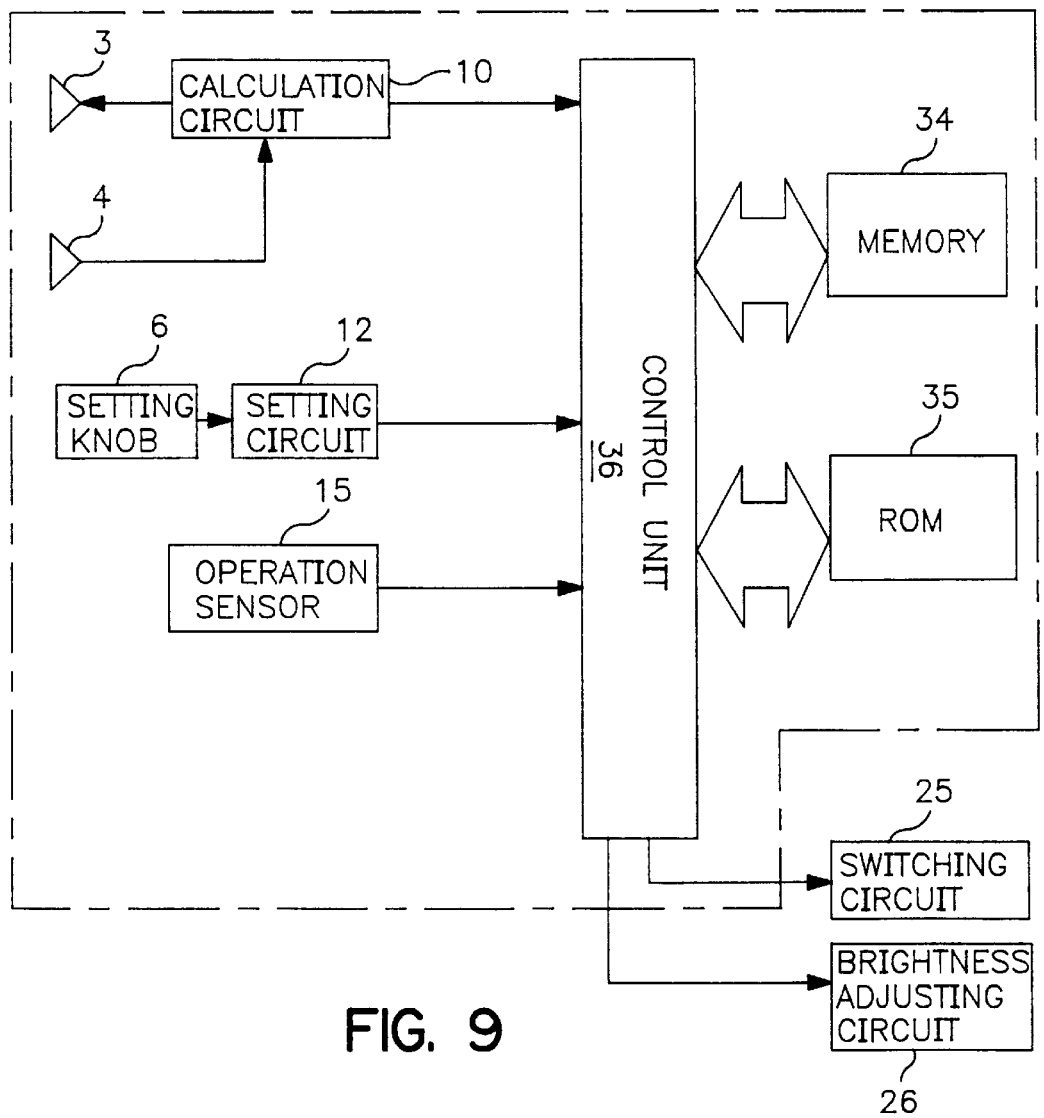
FIG. 9 is a block diagram illustrating a construction of the device of the third embodiment.

FIGS. 8 and 9 illustrate a third embodiment. In this embodiment, an automatic control device 30 for television is contained in the television 20. Reference numeral 34 denotes a memory for storing a distance L set by the setting circuit, 35 denotes a memory storing a control program, and 36 denotes a control unit (determination means) comprising a CPU or the like that compares the predetermined distance L stored in the memory 34 with the distance measured by the calculation circuit 10, and controls the switching circuit (turn-off means) 25 or the brightness adjusting circuit (brightness changing means) 26 of the television 20 when the measured distance becomes shorter than the predetermined distance L.

The switching circuit 25 works to turn on or off the auxiliary power source of the television 20. The brightness adjusting circuit 26 adjusts the brightness of the screen 21.

According to the third embodiment, when the infant 9 approaches the television 20 within the predetermined distance L, the distance measured by the calculation circuit 10 becomes shorter than the predetermined distance L, whereby the control unit 36 controls the brightness adjusting circuit 26 to lower the brightness of the screen 21 to give warning. In this case, characters may be displayed on the screen 21 to give warning.

When the infant 9 does not move away from the television 20 by more than the predetermined distance L even after the a predetermined period of time (e.g., 5 seconds) has passed from the start of the warning, i.e., when the distance measured by the calculation circuit 10 after five seconds have passed is shorter than the predetermined distance L, the control unit 36 controls the switching circuit 25 to turn the auxiliary power source off. Accordingly, the infant 9 is not allowed to watch the television 20 any longer.

When the infant 9 moves away from the television 20 by more than the predetermined distance L in less than five seconds, i.e., when the distance measured by the calculation circuit 10 in less than five seconds from the start of the warning becomes longer than the predetermined distance L, the control unit 36 stops controlling the brightness adjusting circuit 26, and the screen 21 resumes the initial brightness.

[Fourth Embodiment]

Figure 10:
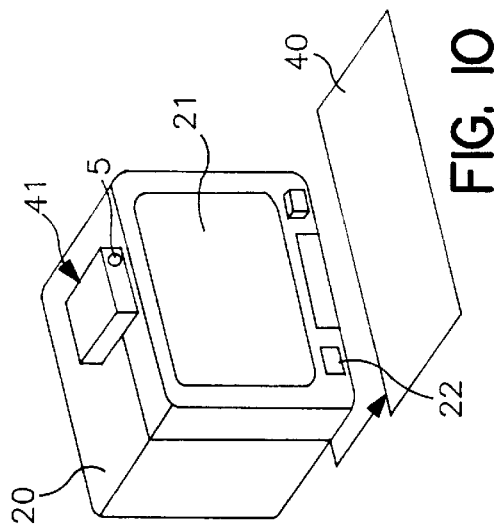
FIG. 10 is a perspective view illustrating a fourth embodiment of the present invention.
Figure 11:
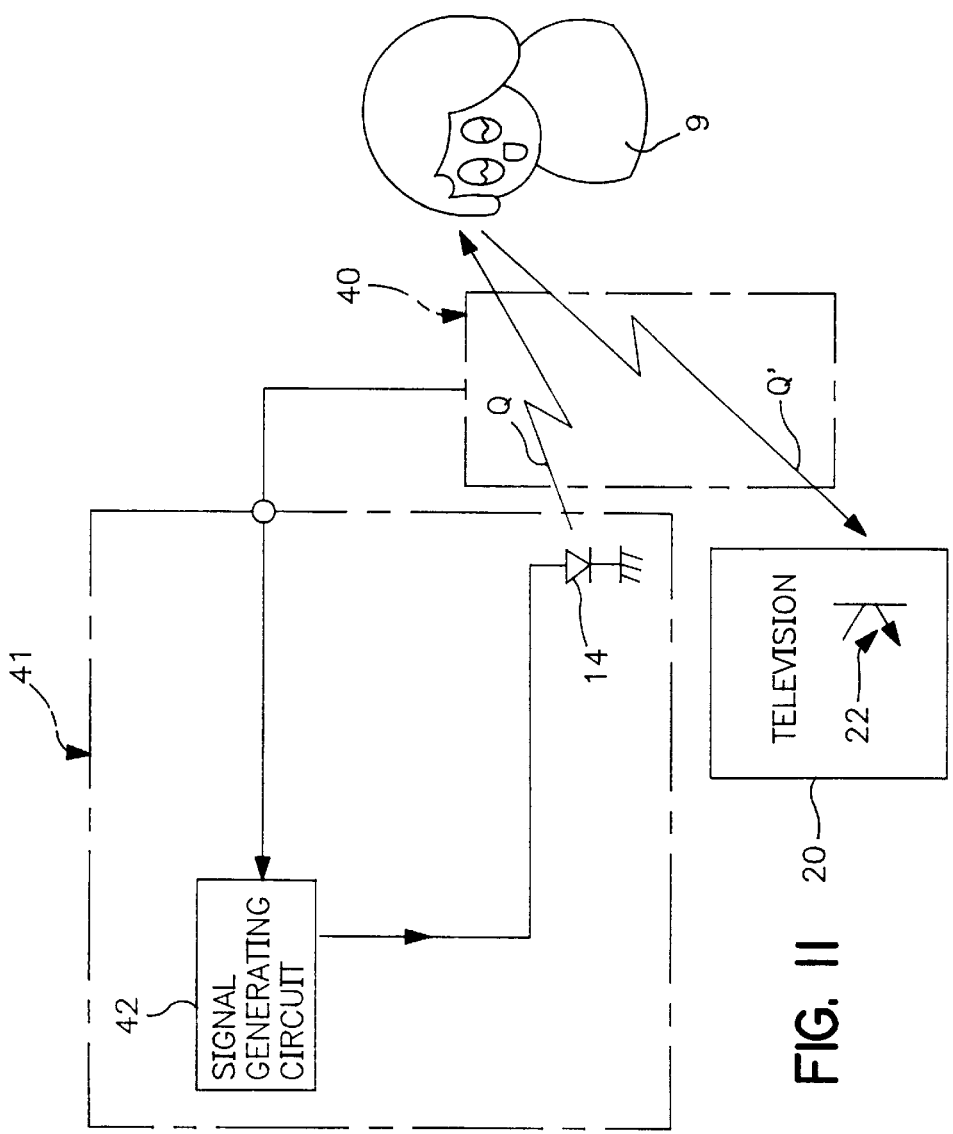
FIG. 11 is a block diagram illustrating a construction in the fourth embodiment.

FIGS. 10 and 11 illustrate a fourth embodiment. In this embodiment, a mat 40 is placed on the floor in front of the screen 21 of the television 20, and the auxiliary power source of the television 20 is turned off when the infant 9 sits on the mat 40.

The mat 40 includes a switch, not shown. When the infant 9 sits on the mat 40, the switch is turned on, and thereby it is detected that the infant 9 has approached the television 20 within the predetermined distance.

Reference numeral 41 denotes an infrared-ray emitter placed on the television 20. The infrared-ray emitter 41 contains a signal generating circuit 42 for outputting a power source signal when the switch in the mat 40 is turned on, and the infrared-ray emitting diode 14. The signal generating circuit 42 outputs the power source signal even when the switch in the mat 40 is changed from a turn-on state to a turn-off state.

Accordingly, when the infant 9 sits on the mat 40, the signal generating circuit 42 outputs the power source signal, and the infrared-ray emitting diode 14 emits an infrared ray by which the auxiliary power source of the television 20 is turned off so that it is no longer allowed to watch the television 20. When the infant 9 moves away from the mat 40, the signal generating circuit 42 outputs again the power source signal, the infrared-ray emitting diode 14 emits an infrared ray by which the auxiliary power source of the television 20 is turned on so that it is allowed to watch again television 20.

The mat 40 and the infrared-ray emitter 41 makes up the device for automatically controlling the television.

Figure 12:
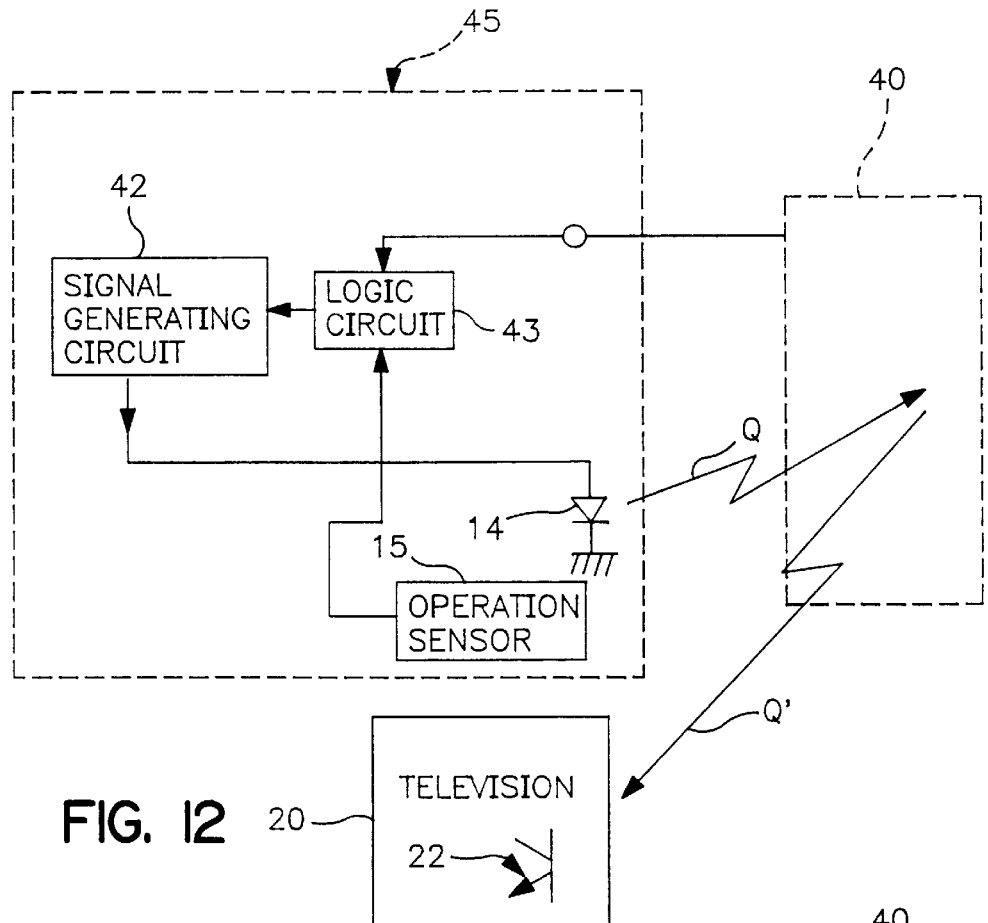
FIG. 12 is a block diagram illustrating a construction in another example of the fourth embodiment.

FIG. 12 illustrates another example according to the fourth embodiment, in which reference numeral 45 denotes an infrared-ray emitter that is to be placed on the television 20. The infrared-ray emitter 45 includes an operation sensor 15 and a logic circuit 43 in addition to the signal generating circuit 42 and the infrared-ray emitting diode 14. The logic circuit 43 causes the signal generating circuit 42 to output the power source signal when the switch in the mat 40 is turned on while the operation sensor 15 is detecting the operation of the television 20.

In a state in which the operation sensor 15 is detecting the operation of the television 20, the logic circuit 43 causes the signal generating circuit 42 to output the power source signal when the switch in the mat 40 is turned off. Therefore, when the infant 9 moves away from the mat 40, the television 20 is turned on.

Figure 13:
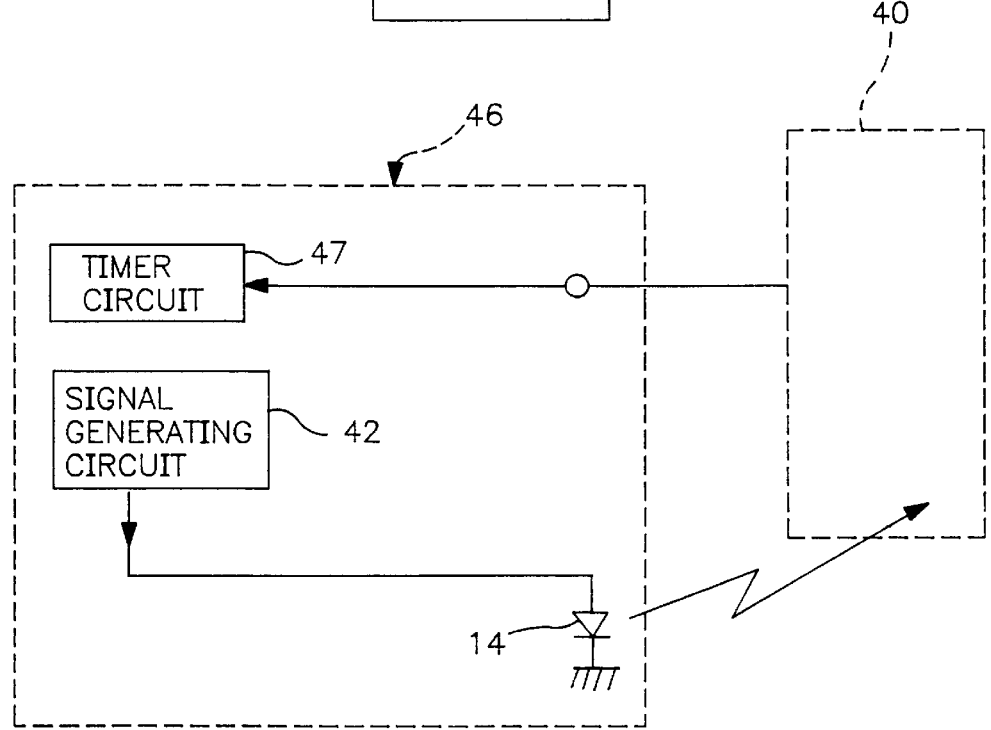
FIG. 13 is a block diagram illustrating a construction in still another example of the fourth embodiment.

FIG. 13 illustrates another example of the fourth embodiment, in which reference numeral 46 denotes an infrared-ray emitter placed on the television 20. The infrared-ray emitter 46 contains a timer circuit 47 in addition to the signal generating circuit 42. The timer circuit 47 starts counting when the switch in the mat 40 is in an on-state, and the signal generating circuit 42 outputs the power source signal when the timer circuit 47 completes counting a predetermined period of time.

That is, the power source of the television 20 is turned off after a predetermined period of time, for example, five seconds has passed since the infant 9 sat on the mat 40. When the infant 9 leaves the mat 40 in less than five seconds, the timer circuit 47 is reset and the television 20 remains on.

The timer circuit 47 starts counting the time when the infant 9 moves away from the mat 40 and the switch in the mat 40 is turned off after the signal generating circuit 42 outputs the power source signal, i.e., after the television 20 is turned off. When the counting of the predetermined period of time (e.g., five seconds) is completed, the signal generating circuit 42 outputs the power source signal. Then, the television 20 is turned on again and the infant is allowed to watch the television 20.

That is, when the infant 9 sits on the mat 40, the television 20 is turned off five seconds thereafter and, when the infant 9 leaves the mat 40, the television 20 is turned on five seconds thereafter. The reason why such a time lag is set up is that, if the television 20 is turned on and off simultaneously with the turn on and off of the switch disposed in the mat 40, the infant 9 might play on the mat 40 merely for the fun of doing so.

[Fifth Embodiment]

Figure 14:
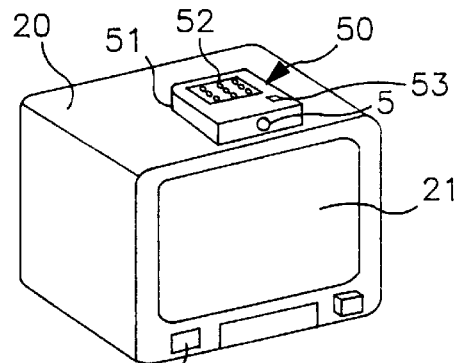
FIG. 14 is a perspective view illustrating a fifth embodiment of the present invention.
Figure 15:
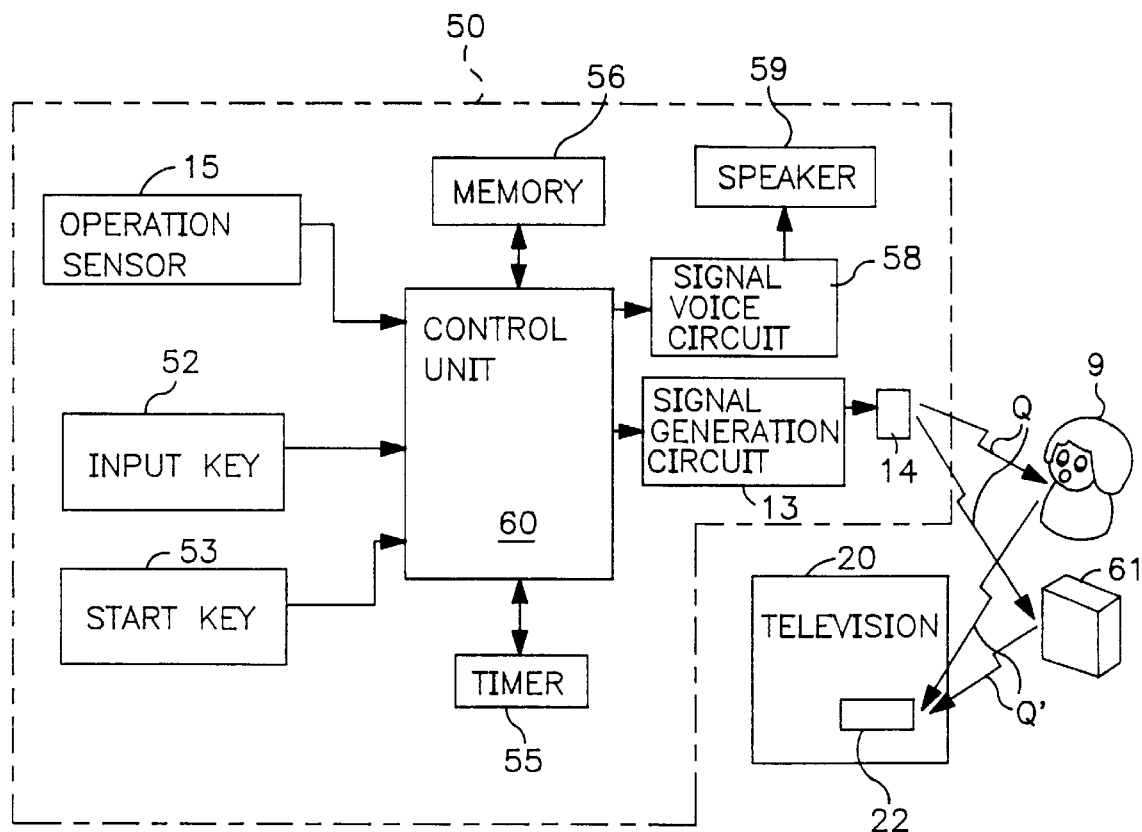
FIG. 15 is a block diagram illustrating a construction of the device according to the fifth embodiment.

FIGS. 14 and 15 illustrate a fifth embodiment, wherein reference numeral 50 denotes a device for automatically controlling the television placed on the television 20, and a housing 51 of the device for automatically controlling the television includes an input key 52 for inputting the time for watching and a start key 53.

The device 50 for inhibiting watching television comprises a timer 55, an operation sensor 15 for detecting the operation of the television, a memory 56 for storing message data, a voice signal circuit 58 for converting message data stored in the memory 56 into a voice signal, a speaker 59 for outputting the signal as voice, a signal generating circuit 13, an infrared-ray emitting diode 14, and a control unit 60 constituted by a CPU or the like.

The watching time that is input through the input key 52 is set to the timer 55. The input key 52 and the timer 55 constitute means for setting the watching time.

The control unit 60 controls the signal generating circuit 13 in addition to causing the timer 55 to start counting the time when the start key 53 is depressed and reading the message data stored in the memory 56 and outputting it to the voice signal circuit 58.

The operation in the fifth embodiment will now be described.

A desired time for watching input by manipulating the input key 52 is set to the timer 55. When the start key 53 is depressed, the timer 55 starts counting the time. As the time counted by the timer 55 reaches a predetermined watching time, the timer 55 ceases counting the time. As the counting of the timer 55 is discontinued, the control unit 60 reads message data from the memory 56 and sends them to the voice signal circuit 58, provided that the operation sensor 15 is detecting the operation of the television 20.

Due to this message data, a voice signal is output from the voice signal output circuit 58 and a voice message, such as 'It is time to stop watching !' is output from the speaker 59. Thereafter, the control unit 60 causes the signal generating circuit 13 to output the power source signal. In response to the power source signal, the light emitting diode 14 emits an infrared ray Q which is then reflected by the infant 9 or furniture 61. The reflected infrared ray Q' is received by the light receiving unit 22 of the television 20, and the auxiliary power source switch of the television 20 is turned off. Accordingly, it is no longer allowed to watch television 20 for more than the predetermined time for watching and, thus, inhibiting watching television 20 for extended periods of time.

Figure 16:
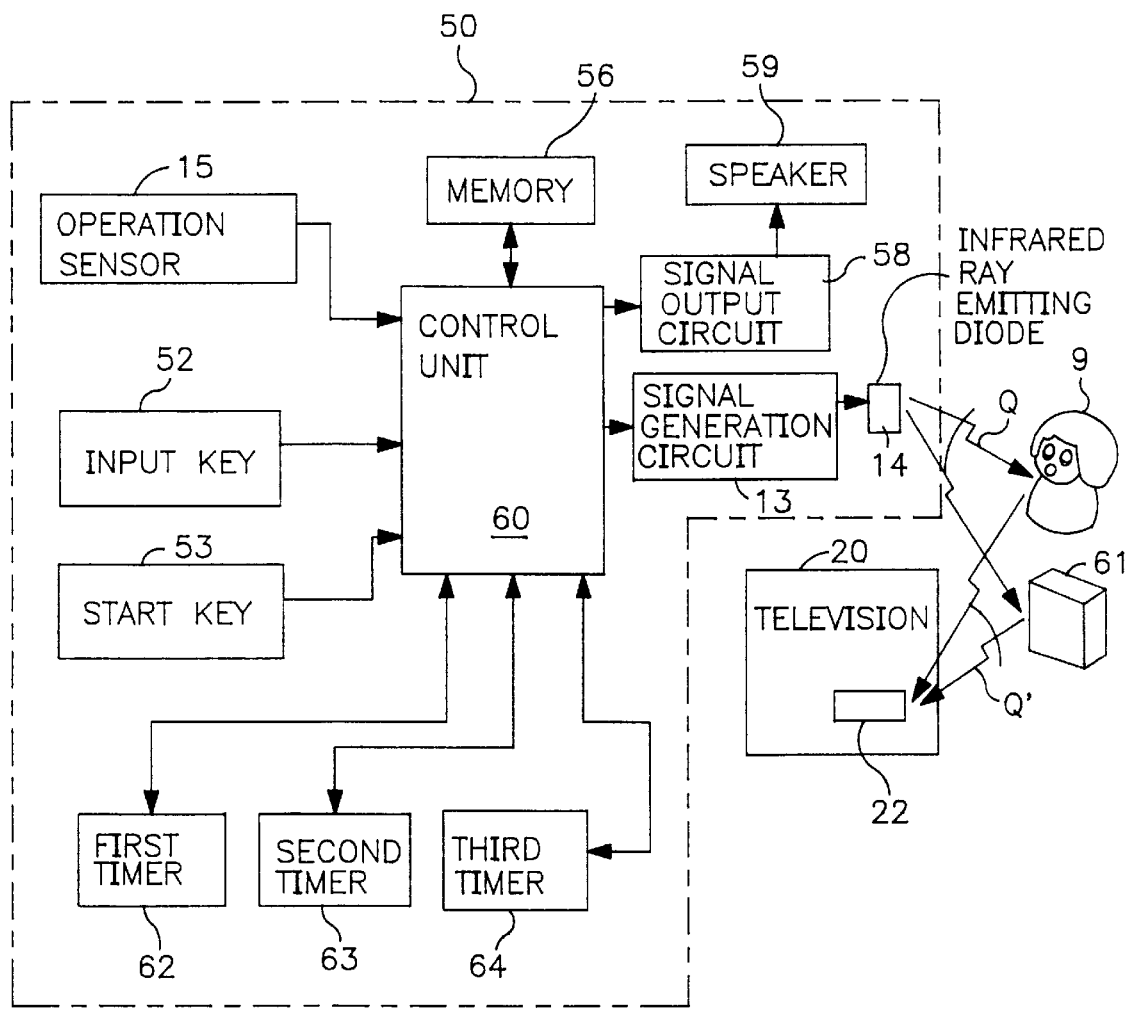
FIG. 16 is a block diagram illustrating a construction of the device according to another example of the fifth embodiment.

FIG. 16 illustrates another example according to the fifth embodiment, wherein reference numeral 62 denotes a first timer for setting a time which is shorter by, for example, five minutes than the time for watching input through the input key 52, and 63 denotes a second timer for counting the remaining time after the first timer 62 has counted a predetermined period of time. When, for instance, the watching time of two hours is input through the input key 52, a time of one hour and fifty-five minutes is set to the first timer 62 and a time of five minutes is set to the second timer 63.

Reference numeral 64 denotes a third timer for setting a time for inhibiting watching the television 20. For example, if the time for inhibiting watching is set to be one hour, an input mode for watching-inhibition is caused to appear by means of an operation button, not shown, and the inhibition time of one hour is input by means of the input key 52. The control unit 60 sets a three-hour period which is obtained by adding an one-hour period to the above-mentioned watching-time of a two-hour period. Upon depressing the start key 53, the third timer 64 starts counting the time. The input key 52 and the third timer 64 constitute means for setting the inhibiting time.

Next, the operation of this embodiment will be described with reference to a time chart of FIG. 17 and a flow chart of FIG. 18.

First, the time for watching the television is input by the input key 52. The watching time of, for example, a two-hour period is input. Next, the time for inhibiting watching is input through the input key 52. When the time for inhibiting watching is to be set to, for example, one hour, a time of three hours is input. The auxiliary power source of the television 20 is turned on by using a remote controller or the like (Step 1).

At Step 2, it is discriminated, based upon the detection by the operation sensor 15, whether the television 20 is in operation or not. When the answer is no, the program returns back to Step 2. When the answer is yes, the program proceeds to Step 3. Here, the auxiliary power source of the television 20 has been turned on at Step 1 so that the television 20 is in operation, and the program proceeds to Step 3.

At Step 3, determination is made whether the third timer 64 is counting the time or not. Since the start key 53 has not yet been depressed, the result of the determination at Step 3 is no, and the program proceeds to Step 4.

When the start key 53 is depressed (moment t0 in FIG. 17), the first and third timers 62, 64 start counting the time (Step 4). At Step 5, it is discriminated whether the first timer 62 has stopped counting the time, i.e., whether the counted time has reached one hour and fifty-five minutes or not. When the answer is no, the program returns back to Step 5. When the time counted by the timer 62 reaches one hour and fifty-five minutes, the timer 62 ceases counting the time and is reset. At Step 5, therefore the result of discrimination becomes yes, and the program proceeds to Step 6.

At Step 6, the second timer 63 starts counting the time (moment t1 in FIG. 17) and at Step 7, the voice 'It is time to stop watching !' is sounded from a speaker 59. The program then proceeds to Step 8 where it is discriminated whether the second timer 63 has stopped counting the time, i.e., whether counting of the time of the second timer 63 has reached five minutes or not. When the answer is no, the program returns back to Step 7 and when the answer is yes, the program proceeds to Step 9.

While the second timer 63 is counting the time, operations of Steps 7 and 8 are repeated, and the voice 'It is time to stop watching !' is sounded repetitively from the speaker 59. That is, alarm by voice is produced repetitively. The voice is set to be sounded every after 30 seconds.

Figure 17:
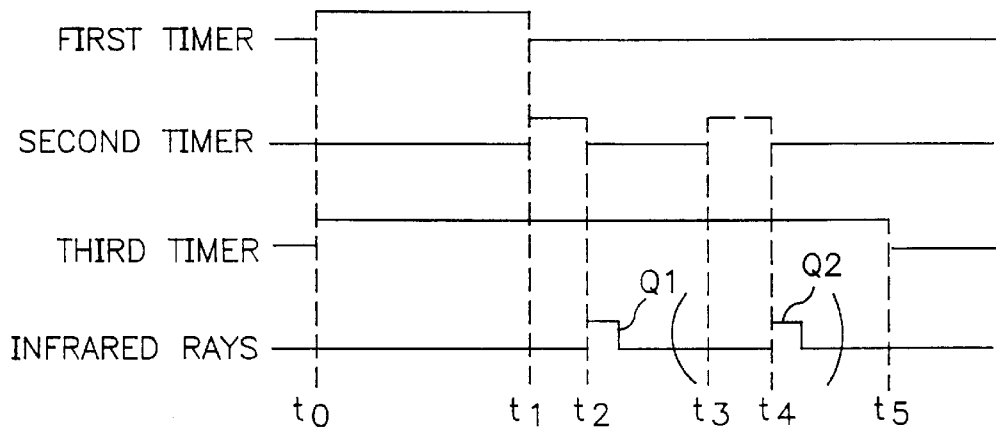
FIG. 17 is a time chart illustrating timings of of the respective operations of timers of the device of FIG. 16.
Figure 18:
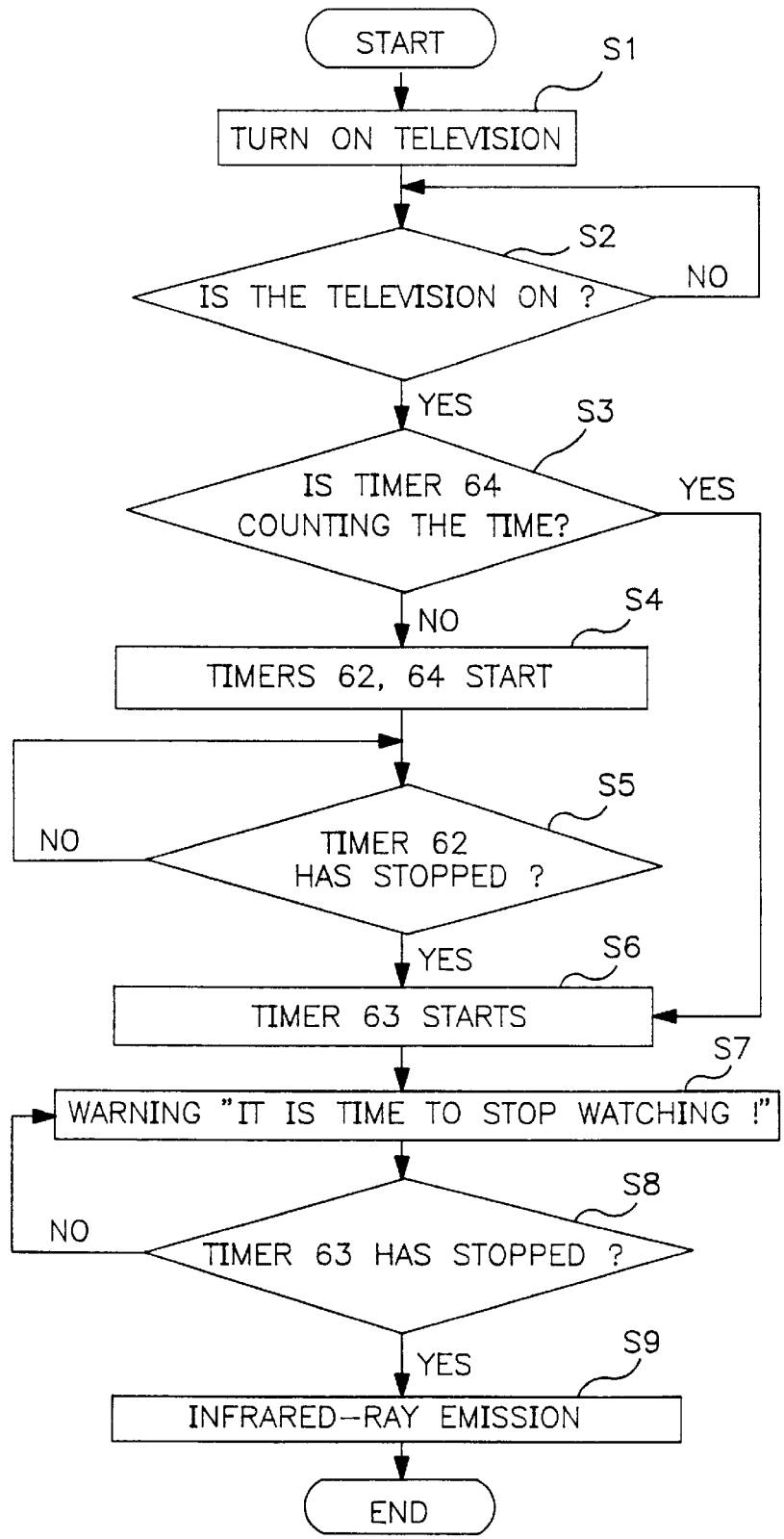
FIG. 18 is a flow chart illustrating the operation of the device of FIG. 16.

When the time counted by the second timer 63 reaches five minutes (moment t2 in FIG. 17), the program proceeds to Step 9 where the signal generating circuit 13 outputs the power source signal so that the infrared-ray emitting diode 14 emits an infrared ray Q1 (moment t2 in FIG. 17). Then, the auxiliary power source switch in the television 20 is turned off, and watching of television 20 is inhibited. That is, when the television 20 is turned on by the remote controller or the like while the third timer 64 is counting the time, the program proceeds to Step 6 from Step 1 passing through Steps 2 and 3, and the second timer 63 is operated by the control unit (control means) 60 and starts counting the time (moment t3 in FIG. 17). Operations of Steps 7 and 8 are repeated until the timer 63 stops counting the time. In the same manner as described above, therefore, the voice 'It is time to stop watching' is sounded from the speaker 59 every after 30 seconds.

When the time counted by the second timer 63 reaches five minutes, the infrared ray Q2 is emitted at Step 9 and the auxiliary power source switch of the television 20 is turned off to terminate the operation. Inhibition for watching television is removed when the time counted by the third timer 64 reaches a three-hour period.

During the time for inhibiting watching, the auxiliary power source is turned off after the passage of five minutes no matter how many times the auxiliary power source of the television 20 is turned on by using the remote controller or the like. Therefore, it is not allowed to continuously watch television 20, which helps prevent the visual power from deteriorating.

In the above-mentioned embodiment, warning is given by voice saying 'It is time to stop watching !'. It is, however, also allowable to let the viewer know the remaining time saying like 'Only five minutes left', 'Only three minutes left', 'Only one minute left', etc. The warning may also be given by using a chime instead of the voice.

The first and third timers 62, 64 start counting the time upon manipulating the start key 53. However, it is also allowable to start counting the time when the operation of the television 20 is detected by the operation sensor 15.

[Sixth Embodiment]

Figure 19:
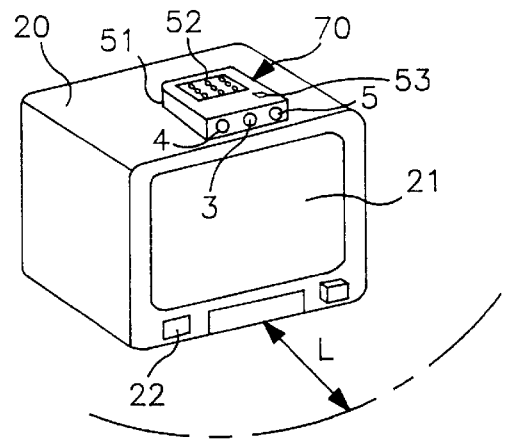
FIG. 19 is a perspective view illustrating a sixth embodiment.
Figure 20:
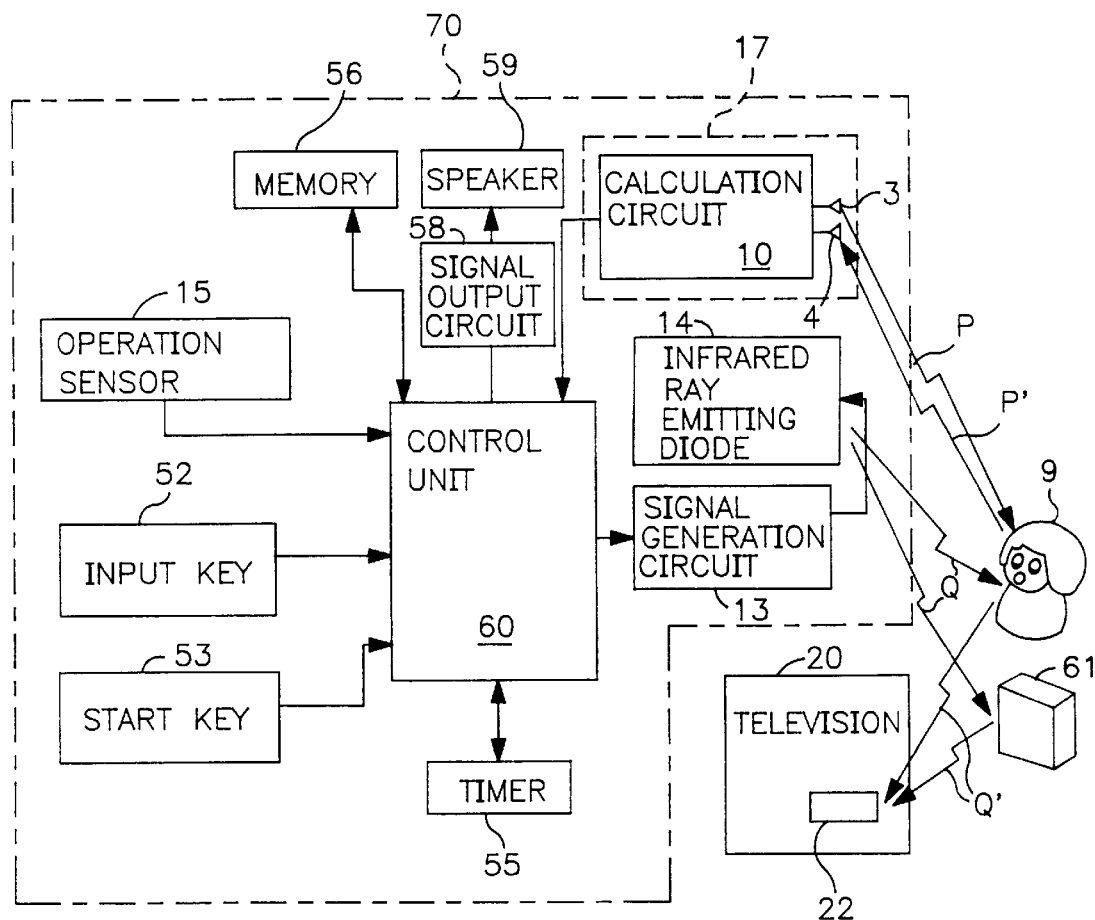
FIG. 20 is a block diagram illustrating a construction of the device according to the sixth embodiment.

FIGS. 19 and 20 illustrate a sixth embodiment. A device 70 for automatically controlling the television according to the sixth embodiment is the same as the device 50 for automatically controlling the television of the fifth embodiment but is provided with a distance measuring circuit 17, and turns the auxiliary power source off and inhibits watching of television 20 when a predetermined time for watching has elapsed or when the infant 9 has approached the television 20. In the sixth embodiment, the predetermined distance L is input in addition to the time for watching by using the input key 52. The predetermined distance L that is input is stored in a memory that is not shown.

The control unit 60 in the device 70 for automatically controlling the television operates in the same manner as the fifth embodiment but, further, compares the distance measured by the calculation circuit 10 with the predetermined distance L input through the input key 52, and causes the signal generating circuit 13 to output the power source signal when the measured distance becomes shorter than the predetermined distance L.

Figure 21:
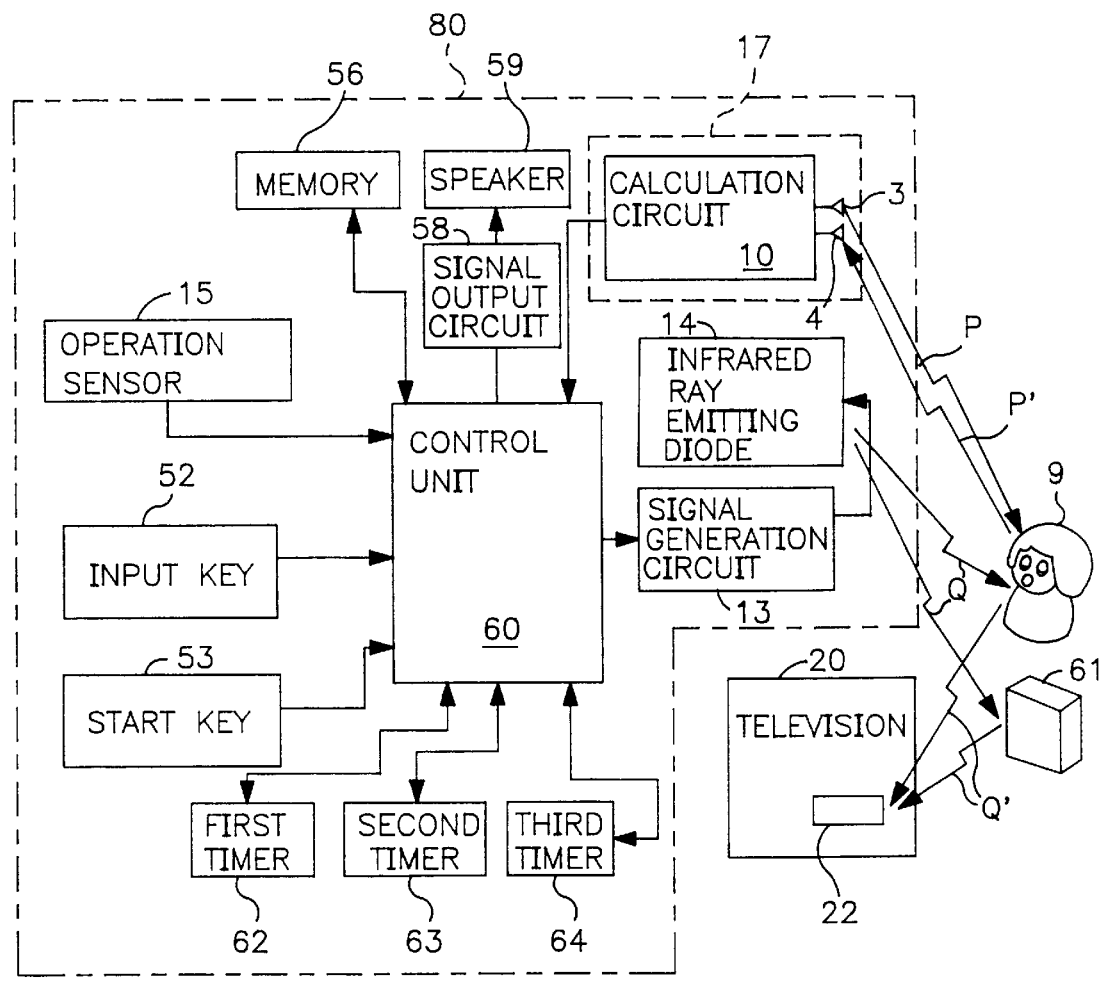
FIG. 21 is a block diagram illustrating a construction of the device according to another example of the sixth embodiment.

A device 80 for automatically controlling the television shown in FIG. 21 is the same as the device 50 for automatically controlling the television shown in FIG. 16 but incorporates the distance measuring circuit 17. The device 80 for automatically controlling the television operates in the same manner as the device 50 for automatically controlling the television of FIG. 16 but, further compares the distance measured by the calculation circuit 10 with the predetermined distance L input through the input key 52, and causes the signal generating circuit 13 to output the power source signal when the measured distance becomes shorter than the predetermined distance L.

[Seventh Embodiment]

Figure 22:
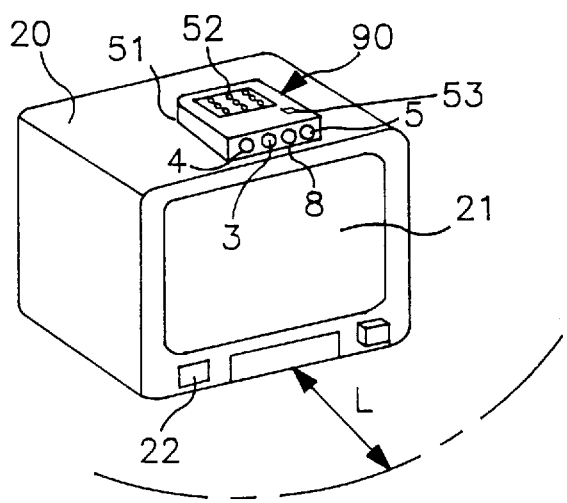
FIG. 22 is a perspective view illustrating a seventh embodiment.

FIG. 22 illustrates a seventh embodiment. On the front surface of a body 51 of a device 90 for automatically controlling the television shown in FIG. 22, there is provided a light receiving unit 8 for receiving an infrared-ray signal R emitted from a portable signal generating unit 100 (see FIG. 23) that will be described later.

Figure 23:
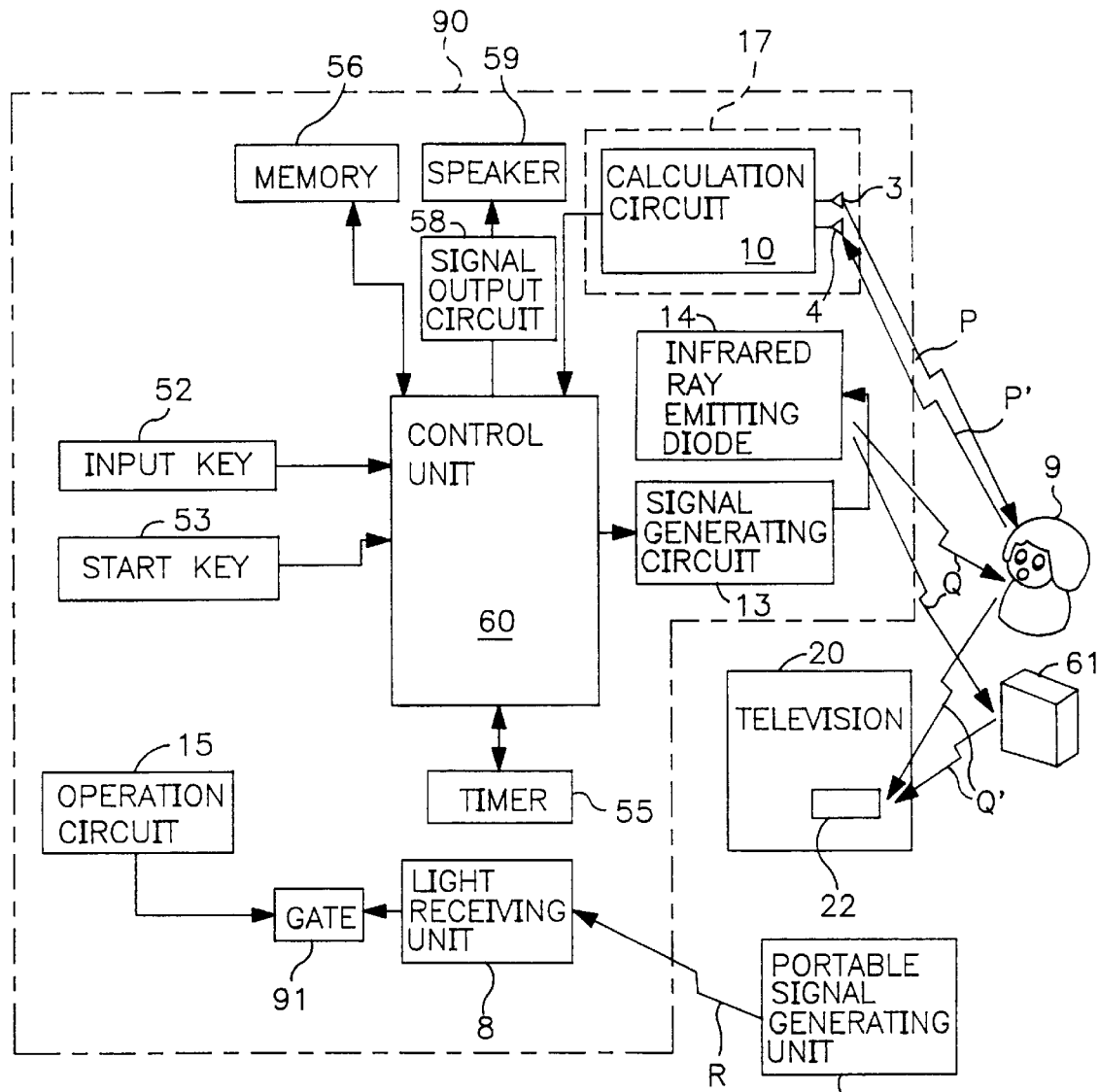
FIG. 23 is a block diagram illustrating a construction of the device according to the seventh embodiment.

In the body 51 of the device 90 for automatically controlling the television, there is provided a gate circuit 91 that opens and closes the gate as shown in FIG. 23. The gate circuit 91 opens the gate when the light receiving unit 8 receives an infrared signal R1 and closes the gate when the light receiving unit 8 receives an infrared signal R2. As the gate circuit 91 opens its gate, the detection signal output from the operation sensor 15 is input to the control unit 60 through the gate circuit 91. As the gate circuit 91 closes its gate, the detection signal output from the operation sensor 15 is no longer output from the gate circuit 91.

Upon manipulation of a button that is not shown, the signal generating unit 100 emits the infrared-ray signal R1 or infrared-ray signal R2 to remotely control the operation of the device 90 for automatically controlling the television.

When, for example a father watches television 20 together with the child 9, the father may hold the signal generating unit 100 and manipulate the button so that the infrared signal R2 is emitted from the signal generating unit 100 to close the gate of the gate circuit 91. As the infrared signal R2 is received by the light receiving unit 8 of the device 90 for automatically controlling the television, the gate circuit 91 closes its gate. Then, the detection signal output from the operation sensor 15 is no longer output from the gate circuit 91.

When the time counted by the timer 55 reaches the preset time for watching, the control unit 60 actuates the signal generating circuit 13 so that the light emitting diode 14 emits a power source signal, provided that the operation sensor 15 is detecting the operation of the television 20. However, since no detection signal is output from the gate circuit 91, the control unit 60 does not actuate the signal generating circuit 13. Therefore, the auxiliary power source of the television 20 is not turned off, and the child 9 is allowed to watch television together with his father even after the time for watching has elapsed.

That is, the television 20 is not automatically turned off so far as the child 9 watches television 20 together with his father. The father may give attention so that the child 9 will not approach the television 20 too closely or will not watch television 20 for extended periods of time.

When the father manipulates the button of the signal generating unit 100 so that the infrared signal R1 is emitted from the signal generating unit 100 to open the gate of the gate circuit 91, the gate circuit 91 opens its gate and the detection signal output from the operation sensor 15 is input to the control unit 60 via the gate circuit 91. When the preset time for watching television elapses or when the child 9 approaches the television 20 too closely, the auxiliary power source is turned off and watching television 20 is inhibited as explained with reference to the sixth embodiment.

The signal generating unit 100 outputs the infrared signal R to open or close the gate of the gate circuit 91. It is, however, also allowable to open or close the gate by sending an electromagnetic wave signal.

Figure 24:
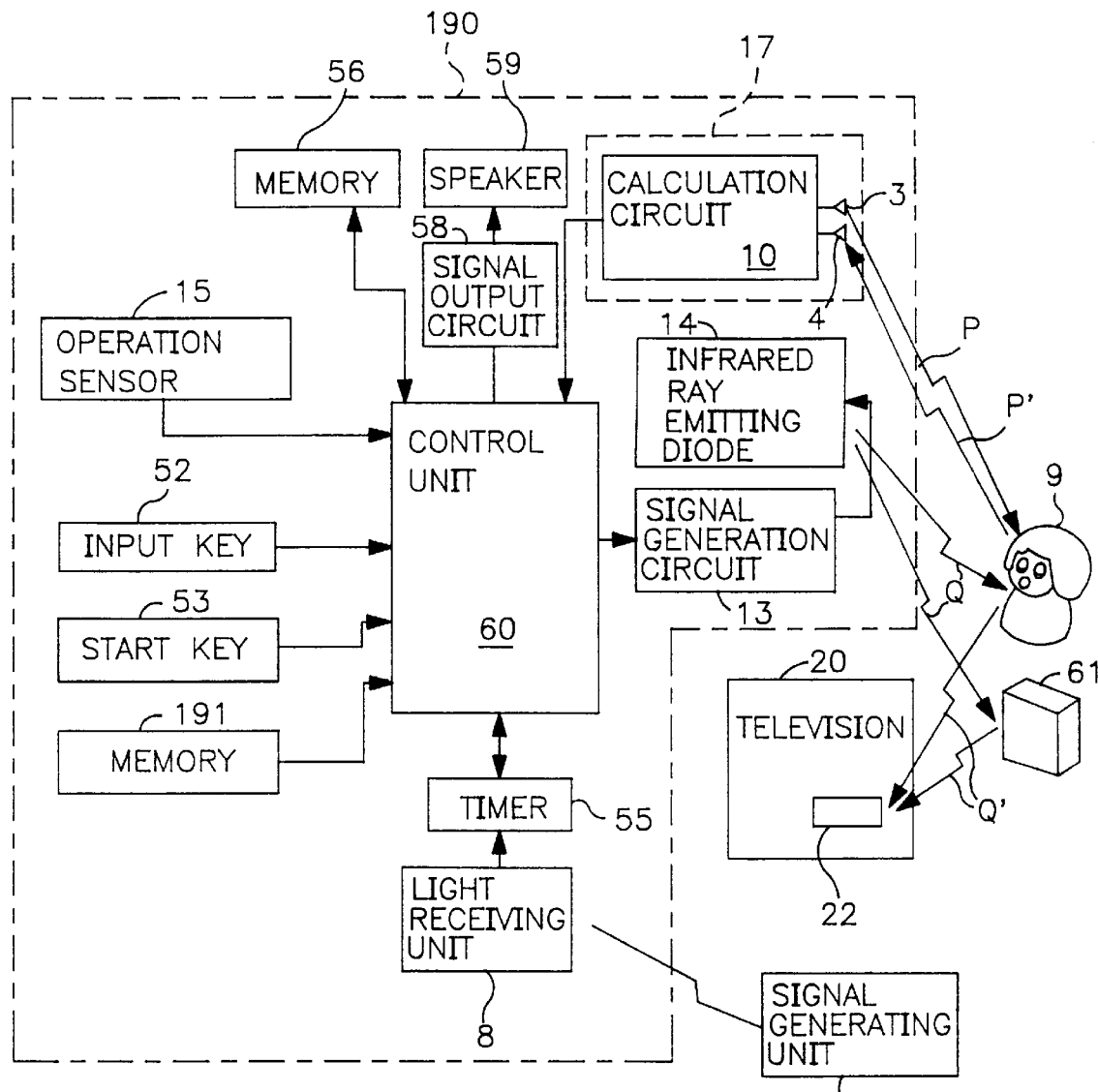
FIG. 24 is a block diagram illustrating a construction of the device according to another example of the seventh embodiment.

FIG. 24 illustrates a device 190 for automatically controlling the television according to another example. A signal generating unit 200 shown in FIG. 24 emits an infrared-ray signal upon manipulating a button that is not shown. When the infrared-ray signal is received by the light receiving unit 8 of the device 190 for automatically controlling the television, the time is no longer counted provided the timer 55 is counting the time. When the light receiving unit 8 receives infrared signal again while the timer 55 is not counting the time, the timer 55 starts counting the time again.

When a parent sets a time for a child 9 to watch television, and when the child watches television together with his parent, the signal generating unit 200 may be so manipulated that the timer 55 no longer counts the time, i.e., the timer 55 is set not to count the time for watching television. Thus, the time is assured for the child 9 to watch television, and determining the length of time for watching television is left to the child's discretion.

In FIG. 24, a memory 191 stores the remaining time of the timer 55 in case the timer 55 stops counting the time. The remaining time of the timer 55 is operated by the control unit 60 at a moment when the timer 55 has stopped counting the time, and is stored in the memory 191.

When the time for watching television a day is set to be, for example, four hours and when the child 9 watches television 20 for three hours only on that day, then, the time for watching of one hour remains. This watching time of one hour can be carried over to the next day owing to the provision of the memory 191. On the next day, therefore, the child is allowed to watch television for five hours.

When the time for watching of four hours is input by manipulating a next-day input key 52, the control unit 60 sets to the timer 55 five hours to which is added one hour stored in the memory 191.

In this embodiment, the time for watching must be set to the timer 55 every time by manipulating the input key 52. However, the time for watching may be automatically set to the timer 55 every day based upon a timekeeping device in the control unit 60. Even in this case, the time for watching can be arbitrarily set by manipulating the input key 52, the time stored in the memory 191 can be added, and the control unit 60 adds the thus added time as the time for watching to the timer 55.

What is claimed is:

1. A device for automatically controlling a television, said television including a light receiving element that receives infrared rays of light and being capable of being operated by remote control, said device comprising:

distance measuring means for measuring a distance between a screen of said television and a viewer viewing said television; and infrared-ray emitting means for emitting a screen changing signal of infrared rays of light by which a state of said screen is changed when the distance measured by said distance measuring means is shorter than a predetermined distance.

2. A device for automatically controlling a television according to claim 1, wherein said screen changing signal is a power source signal for turning on or off an auxiliary power source of said television.

3. A device for automatically controlling a television according to claim 1, wherein said screen changing signal is a channel signal for changing a channel of said television.

4. A device for automatically controlling a television according to claim 1, wherein said distance measuring means comprises a mat that is spread on a floor in front of said television, said mat having a switch that is turned on when the viewer stands or sits on said mat.

5. A device for automatically controlling a television, said television including a light receiving element that receives infrared rays of light and being capable of being operated by remote control, said device comprising:

distance measuring means for measuring a distance between a screen of said television and a viewer viewing said television; and determination means for determining whether or not the distance measured by said distance measuring means is shorter than a predetermined distance; and infrared-ray emitting means for emitting infrared rays of light for turning on or off an auxiliary power source of said television when said determination means determines that the distance measured by said distance measuring means is shorter than the predetermined distance.

6. A device for automatically controlling a television according to claim 5, wherein said determination means causes said infrared-ray emitting means to emit infrared rays of light for turning on or off the auxiliary power source of said television when the measured distance exceeds the predetermined distance within a predetermined period of time after the infrared rays are emitted.

7. A device for automatically controlling a television according to claim 5, further comprising operation detecting means for detecting operation of said television, wherein said determination means causes said infrared-ray emitting means to emit infrared rays of light for turning on or off the auxiliary power source of said television when said operation detecting means detects the operation of said television.

8. A device for automatically controlling a television, said television including a light receiving element that receives infrared rays of light and being capable of being operated by remote control, said device comprising:

distance measuring means for measuring a distance between a screen of said television and a viewer viewing said television;

operation detecting means for detecting operation of said television;

determination means for determining whether or not the distance measured by said distance measuring means is shorter than a predetermined distance;

a timer that starts counting the lapse of time when said determination means determines that the measured distance is shorter than the predetermined distance and when said operation detecting means detects the operation of said television; and infrared-ray emitting means for emitting infrared rays of light for turning on or off an auxiliary power source of said television when said determination means determines that the measured distance is shorter than the predetermined distance at the time said timer counts a predetermined period of time.

9. A device for automatically controlling a television according to claim 8, wherein, if the measured distance exceeds the predetermined distance within a predetermined period of time after said infrared-ray emitting means emits the infrared rays, said determination means causes said infrared-ray emitting means to emit the infrared rays of light for turning on or off the auxiliary power source of said television when a fixed period of time elapses after the measured distance exceeds the predetermined distance.

10. A device for automatically controlling a television according to claim 8, further comprising a buzzer that sounds a warning while said timer is counting the lapse of time.

11. A device for automatically controlling a television, said television including a light receiving element that receives infrared rays of light and being capable of being operated by remote control, said device comprising:

operation detecting means for detecting operation of said television;

watching-time setting means for setting a period of time during which a viewer watches television;

a timer that counts watching time set by said watching-time setting means; and infrared-ray emitting means for emitting infrared rays of light for turning on or of an auxiliary power source of said television when a period of time counted by said timer reaches the watching time set by said watching-time setting means while said operation detecting means is detecting the operation of said television.

12. A device for automatically controlling a television according to claim 11, further comprising:

distance measuring means for measuring a distance between a screen of said television and a viewer watching said television;

determination means for causing said infrared-ray emitting means to emit infrared rays of light for turning on or off the auxiliary power source of said television when said determination means determines that the distance measured by said distance measuring means is shorter than the predetermined distance.

13. A device for automatically controlling a television according to claim 11, further comprising:

a signal generating unit that operates said device for automatically controlling said television by remote control;

a signal receiving portion for receiving a signal transmitted from said signal generating unit; and output stopping means for stopping outputting a detection signal obtained by said operation detecting means when said signal receiving portion receives the signal transmitted from said signal generating unit;

said signal receiving portion and said output stopping means being mounted in a body of said device.

14. A device for automatically controlling a television according to claim 13, further comprising:

distance measuring means for measuring a distance between a screen of said television and a viewer watching said television; and determination means for causing said infrared-ray emitting means to emit infrared rays of light for turning on or off the auxiliary power source of said television when said determination means determines that the distance measured by said distance measuring means is shorter than the predetermined distance;

said distance measuring means and said determination means being mounted in the body of said device.

15. A device for automatically controlling a television according to claim 11, further comprising:

a signal generating unit that operates said device for automatically controlling said television by remote control; and a signal receiving portion, mounted in a body of said device, for receiving a signal transmitted from said signal generating unit.

16. A device for automatically controlling a television according to claim 15, further comprising:

distance measuring means for measuring a distance between a screen of said television and a viewer watching said television; and determination means for causing said infrared-ray emitting means to emit infrared rays of light for turning on or off the auxiliary power source of said television when said determination means determines that the distance measured by said distance measuring means is shorter than the predetermined distance;

said distance measuring means and said determination means being mounted in the body of said device.

17. A device for automatically controlling a television, said television including a light receiving element that receives infrared rays of light and being capable of being operated by remote control, said device comprising:

operation detecting means for detecting operation of said television;

watching-time setting means for setting a watching time during which a viewer watches television;

prohibition time setting means for setting prohibition time during which the viewer is prohibited from watching television again without interruption;

a first timer that counts a second watching time shorter by a fixed time than the watching time set by said watching-time setting means;

a second timer that starts counting only said fixed time from a moment when said first timer completes counting said second watching time;

a third timer that counts said prohibition time set by said prohibition time setting means;

warning means for warning that an end of said watching time set by said watching-time setting means is approaching while said second timer is counting said fixed time;

infrared-ray emitting means for emitting infrared rays of light for turning on or off an auxiliary power source of said television when said second timer completes counting said fixed time while said operation detecting means is detecting the operation of said television; and control means for actuating said second timer when said operation detecting means detects the operation of said television while said third timer is counting said prohibition time after said second timer completes counting said fixed time.

* * * * *

UNITED STATES PATENT AND TRADEMARK OFFICE
CERTIFICATE OF CORRECTION

PATENT NO. : 5,805,201

DATED : 9/8/98

INVENTOR(S) : Fujiwara

It is certified that error appears in the above-identified patent and that said Letters Patent is hereby corrected as shown below:

Column 2, line 36, delete "of" (second occurrence).

Signed and Sealed this

Twenty-third Day of February, 1999

Attest:

Q. TODD DICKINSON

Attesting Officer

Acting Commissioner of Patents and Trademarks